(12) United States Patent
Priest et al.

(10) Patent No.: US 10,270,281 B1
(45) Date of Patent: Apr. 23, 2019

(54) IN LINE MANUALLY ACTUATED BATTERY CHARGER FOR TACTICAL RADIO

(71) Applicant: Combat Power Solutions, LLC, Apex, NC (US)

(72) Inventors: Edward Johnson Priest, West End, NC (US); Samuel Dwight Cline, Merritt Island, FL (US)

(73) Assignee: COMBAT POWER SOLUTIONS, LLC, Apex, NC (US)

( * ) Notice: Subject to any disclaimer, the term of this patent is extended or adjusted under 35 U.S.C. 154(b) by 0 days.

(21) Appl. No.: 16/037,995

(22) Filed: Jul. 17, 2018

(51) Int. Cl.
*H02J 7/14* (2006.01)
*H02K 1/12* (2006.01)
*H02J 7/00* (2006.01)

(52) U.S. Cl.
CPC .............. *H02J 7/14* (2013.01); *H02J 7/0042* (2013.01); *H02J 7/0052* (2013.01); *H02K 1/12* (2013.01)

(58) Field of Classification Search
CPC ........... H02J 7/14; H02J 7/0042; H02J 7/0052
USPC ................. 290/1 R, 4 C; 340/573.1; 307/68; 320/114
See application file for complete search history.

(56) References Cited

U.S. PATENT DOCUMENTS

| | | | |
|---|---|---|---|
| 4,227,092 A * | 10/1980 | Campagnuolo | ........ H02K 7/116 290/1 C |
| 5,347,186 A | 9/1994 | Konotchick | |
| 6,291,900 B1 * | 9/2001 | Tiemann | ................... H02P 9/04 290/1 A |
| 6,914,340 B2 | 7/2005 | Becker et al. | |
| 6,930,403 B2 | 8/2005 | Hartman et al. | |
| 7,148,583 B1 * | 12/2006 | Shau | ..................... H02K 7/1876 290/1 R |
| 7,239,237 B2 * | 7/2007 | Hess | ...................... H04B 1/086 340/539.1 |
| 9,273,554 B2 | 3/2016 | Mungas et al. | |
| 9,316,249 B2 | 4/2016 | Yoshizawa et al. | |

(Continued)

FOREIGN PATENT DOCUMENTS

| | | |
|---|---|---|
| GB | 1421804 | 1/1976 |
| WO | WO-2001/29952 A1 | 4/2001 |
| WO | WO-2011/057070 A2 | 5/2011 |

OTHER PUBLICATIONS

"Product Catalog AN/PRC-148 Family Radios," Thales, www.thalescommic.com, pp. 1-48 (Dec. 2010).

(Continued)

*Primary Examiner* — Viet P Nguyen
(74) *Attorney, Agent, or Firm* — Jenkins, Wilson, Taylor & Hunt P.A.

(57) ABSTRACT

According to aspect, the subject matter described herein includes an in line manually actuated charging device for a tactical radio. The charging device includes a housing enclosing the charger for charging a battery of the tactical radio. A manual actuator is coupled to the housing for actuating the charger to charge the battery. A first mechanical connector is located on a first surface of the housing for detachably connecting to a battery connector of the tactical radio. The second mechanical connector is located on a second surface of the housing opposite a first surface for detachably connecting to the battery of the tactical radio. The first and second mechanical connectors are configured such that the housing fits in line between the tactical radio and the battery during use of the tactical radio.

20 Claims, 10 Drawing Sheets

(56) References Cited

U.S. PATENT DOCUMENTS

| | | |
|---|---|---|
| 9,888,337 B1 | 2/2018 | Zalewski et al. |
| 2003/0030342 A1 | 2/2003 | Chen et al. |
| 2004/0090210 A1* | 5/2004 | Becker .................... F21L 13/06 |
| | | 322/1 |
| 2004/0130156 A1* | 7/2004 | Hartman .................. G05G 1/30 |
| | | 290/1 A |
| 2006/0119104 A1 | 6/2006 | Wall |
| 2006/0146522 A1* | 7/2006 | Lee ........................ H04B 1/086 |
| | | 362/171 |
| 2007/0080814 A1* | 4/2007 | Ellsworth ............ G08B 27/008 |
| | | 340/573.1 |
| 2008/0106149 A1* | 5/2008 | Yen .......................... H02J 7/32 |
| | | 307/39 |
| 2010/0027249 A1* | 2/2010 | Connor .................... F21L 4/08 |
| | | 362/183 |
| 2012/0028538 A1 | 2/2012 | Wong |
| 2014/0158698 A1 | 6/2014 | Bonnel et al. |

OTHER PUBLICATIONS

"Type-1 Mulitband Multitmission Handheld Radio AN/PRC-152," Harris assured communications, harris.com, pp. 1-2 (2012).

* cited by examiner

IN LINE MANUALLY ACTUATED BATTERY CHARGER FOR TACTICAL RADIO

TECHNICAL FIELD

The subject matter described herein relates to charging devices for charging rechargeable batteries for tactical radios. More particularly, the subject matter described herein relates to an in line, manually actuated battery charger for a tactical radio.

BACKGROUND

Tactical radios, such as the portable radio communications (PRC) 148 and PRC 152 available from Thales Communications are hand-held devices that are in wide use around the world for field communications between military and law enforcement users. Tactical radios typically include a rechargeable battery that connects to the housing of the tactical radio. Users may carry spare batteries for rapid field replacement. In the field, batteries that become discharged are often disposed of because of the lack of a field charging mechanism.

Accordingly, there exists a need for a charging system for tactical radios that is portable, convenient to use, and does not require an external source of electrical energy.

SUMMARY

According to aspect, the subject matter described herein includes an in line manually actuated charging device for a tactical radio. The charging device includes a housing enclosing the charger for charging a battery of the tactical radio. A manually actuated is coupled to the housing for actuating the charger to charge the battery. A first mechanical connector is located on a first surface of the housing for detachably connecting to a battery connector of the tactical radio. The second mechanical connector is located on a second surface of the housing opposite a first surface for detachably connecting to the battery of the tactical radio. The first and second mechanical connectors are configured such that the housing fits in line between the tactical radio and the battery during use of the tactical radio.

According to another aspect of the subject matter described herein, an in line manually actuated charging device for charging a battery of a tactical radio includes a housing enclosing a charger for charging a battery of a tactical radio.

A manual actuator is coupled to the housing for actuating the charger to charge the battery of the tactical radio. The charging device further includes a first mechanical connector located on a first surface of the housing for detachably connecting the first surface of the housing to a battery connector of the tactical radio, wherein housing enclosing the charger rotates from a first position in which the first mechanical connector connects with a corresponding mechanical connector on the tactical radio to rotationally lock the housing enclosing the charger to the tactical radio and to a second position for disengaging the first mechanical connector from the corresponding mechanical connector on the tactical radio. The charging device further includes a second mechanical connector located on a second surface of the housing opposite the first surface for detachably connecting to the battery of the tactical radio, wherein battery rotates from a first position in which a connector on the battery connects with the second mechanical connector to rotationally lock the battery to the housing enclosing the charger and to a second position for disengaging the battery from the second mechanical connector and the first and second mechanical connectors are configured such that the housing fits in line between the tactical radio and the battery.

According to another aspect of the subject matter described herein, an in line manually actuated charging device for charging a battery of a tactical radio includes a housing enclosing a charger for charging a battery of a tactical radio.

A manual actuator is coupled to the housing for actuating the charger to charge the battery of the tactical radio. The charging device further includes a first mechanical connector located on the first surface of the housing for connecting the first surface of the housing to a battery connector of the tactical radio. The charging device further includes a second mechanical connector located on the second surface of the housing opposite the first surface for detachably connecting to the battery of the tactical radio, wherein the first and second mechanical connectors are configured such that the housing fits in line between the tactical radio and the battery, wherein the charger comprises at least one magnet, stator laminations, at least one coil, and at least one gear assembly rotationally coupled to the manual actuator and to the at least one magnet such that M rotations of the manual actuator produces N movements of the at least one magnet with respect to the stator laminations and coils, N and M being integers and N>M, to produce a current in the at least one coil.

DETAILED DESCRIPTION

Figure 1:
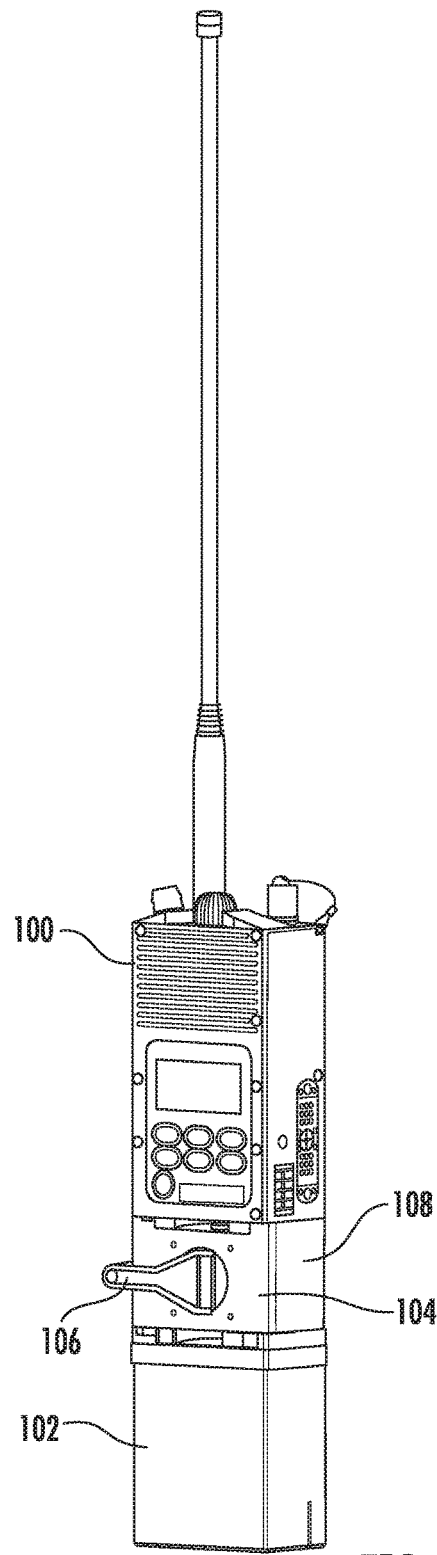
FIG. 1 is a perspective view of a tactical radio, a battery, and a charging device located in line between the tactical radio and the battery.

The subject matter described herein includes an in line manually actuated charging device for a tactical radio. FIG. 1 is a diagram of a tactical radio, a battery, and a charging device for the tactical radio where the charging device is detachably coupled between the tactical radio and the battery. Referring to FIG. 1, tactical radio 100 may be any suitable portable communications device. Examples of tactical radios for which the subject matter described herein may be designed include, but are not limited to, the above referenced PRC 148 and PRC 152 radios. Tactical radio 100 is powered by a rechargeable battery 102. If radio 100 is the PRC 148, battery 102 may be a 10.8 volt lithium ion battery. If radio 100 is a PRC 152, battery 102 may be a 12.75 volt lithium ion battery.

Without an in line field charging device, battery 102 connects to the lower surface of the housing of tactical radio 100. However, the subject matter described herein includes charging device 104 that fits in line between tactical radio 100 and battery 102. Charging device 104 includes a manual actuator, which in the illustrated example is a hand crank 106 that actuates a charger located within a housing 108 of charging device 104 to charge battery 102. As can be seen in FIG. 1, housing 108 has a form factor that corresponds to the form factor of tactical radio 100 and battery 102 such that charging device 104 can remain connected in line between tactical radio 100 and battery 102 and charge battery 102 during use of tactical radio 100.

Figure 2:
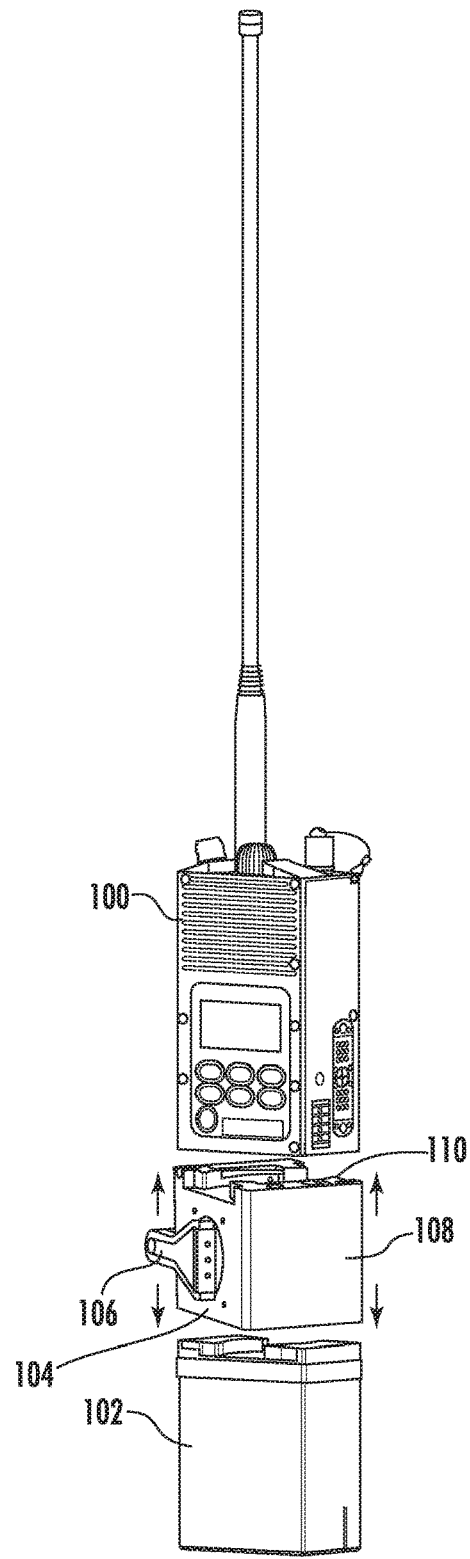
FIG. 2 is a disassembled view of the tactical radio, the charging device, and the battery in FIG. 1.

FIG. 2 is a disassembled view of the tactical radio, charging device, and battery illustrated in FIG. 1. In FIG. 2, housing 108 includes a first mechanical connector 110 located on the top surface of housing 108 for connecting to a battery connector of tactical radio 100 and a second mechanical connector (not shown in FIG. 2) on the bottom surface of housing 108 for connecting to battery 102. In one example, the first and second mechanical connectors on housing 108 may be twist lock connectors that connect to corresponding twist lock connectors on tactical radio 100 and battery 102. However, any suitable type of mechanical interconnection where charging device 104 can be mechanically connected to and disconnected from tactical radio 100 and battery 102 is intended to be within the scope of the subject matter described herein.

Figure 3:
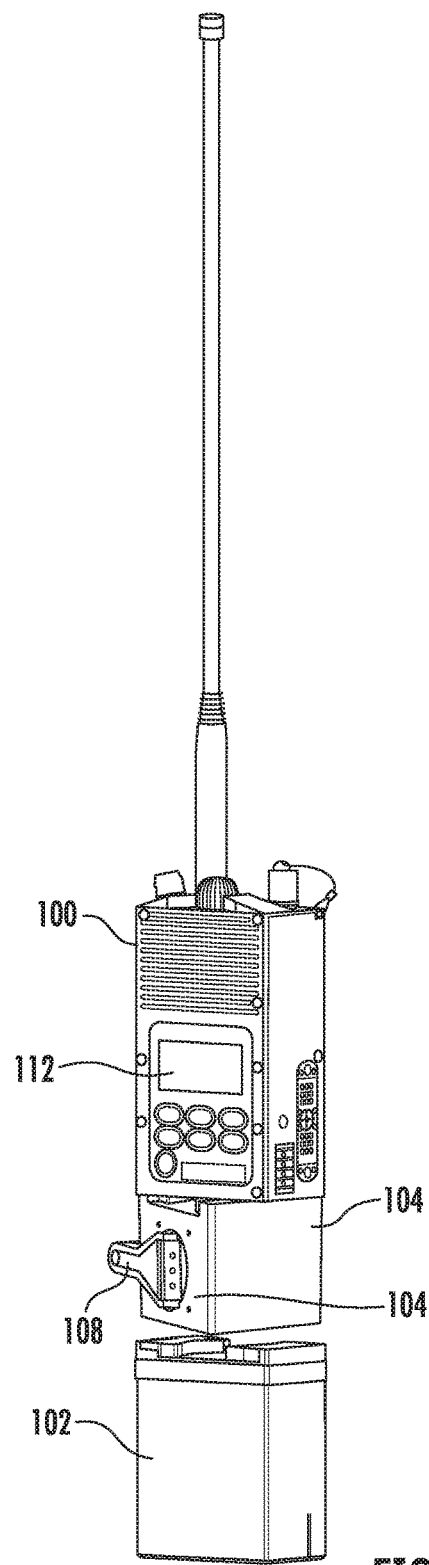
FIG. 3 is a diagram illustrating connection of the charging device to the tactical radio.

FIG. 3 is a perspective view of tactical radio 100, battery 102, and charging device 104 illustrating the connection of charging device 104 to tactical radio 100 via a twist lock interconnection. In the illustrated example, the battery connector of tactical radio 100 is inserted into the mechanical connector on the top surface of housing 108 at a position that is rotationally offset from the operational position of housing 108 with respect to tactical radio 100 and then twisted clockwise such that the surface of housing 108 that includes hand crank 106 is aligned with the surface of tactical radio 100 that includes display 112. A similar twist connection may be performed to connect battery 102 to the lower surface of housing 108 and charging device 104.

Figure 4:
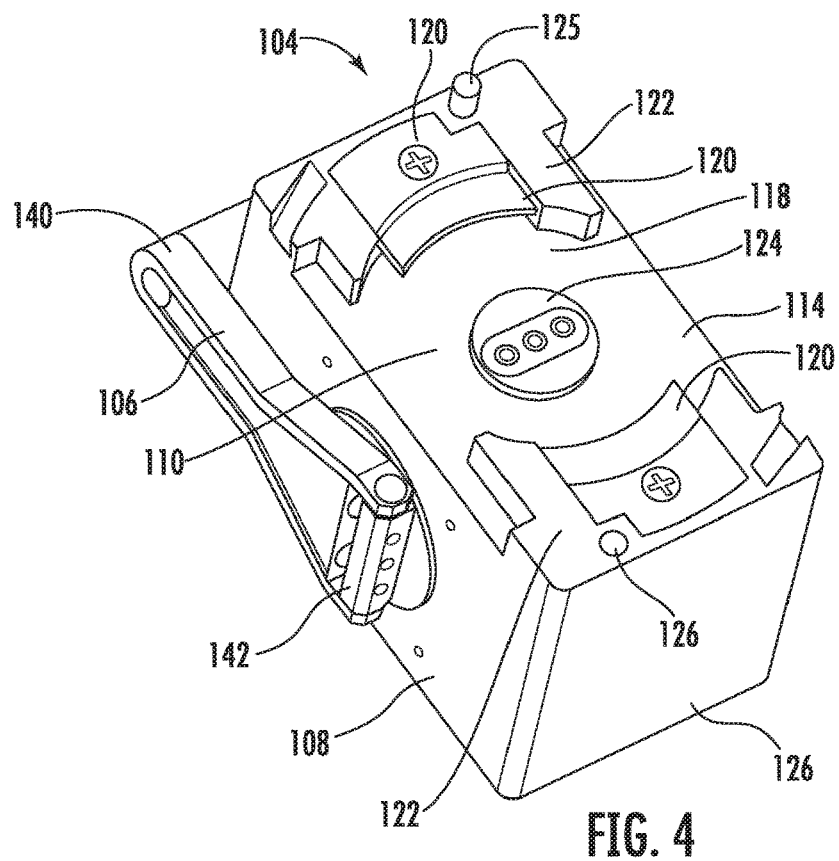
FIG. 4 is a top perspective view of the charging device illustrated in FIGS. 1-3.

FIG. 4 is a top perspective view of charging device 104. In FIG. 4, housing 108 of charging device 104 includes a top surface 114 that includes first mechanical connector 110, which in the illustrated example is a female twist lock connector for connecting with a male twist lock connector located on a lower surface of tactical radio 100. Twist lock connector 110 includes an open central region 118 for receiving the twist lock connector on tactical radio 100. Overhang members 120 hold the twist lock connector of tactical radio 100 in place when the twist lock connector is twisted into the operational position. Rotational stops 122 prevent the twist lock connector of tactical radio 100 from over-rotating. An electrical connector 124 electrically connects charging device 104 to the battery electrical connection of tactical radio 100. A spring-loaded pin 125 engages a cylindrical recess on the lower surface of tactical radio 100. A cylindrical recess 126 receives a spring-loaded pin located on the lower surface of tactical radio 100. The engagement of the spring-loaded pins with the recesses rotationally locks charging device 104 to tactical radio 100 in the operational position.

Figure 5:
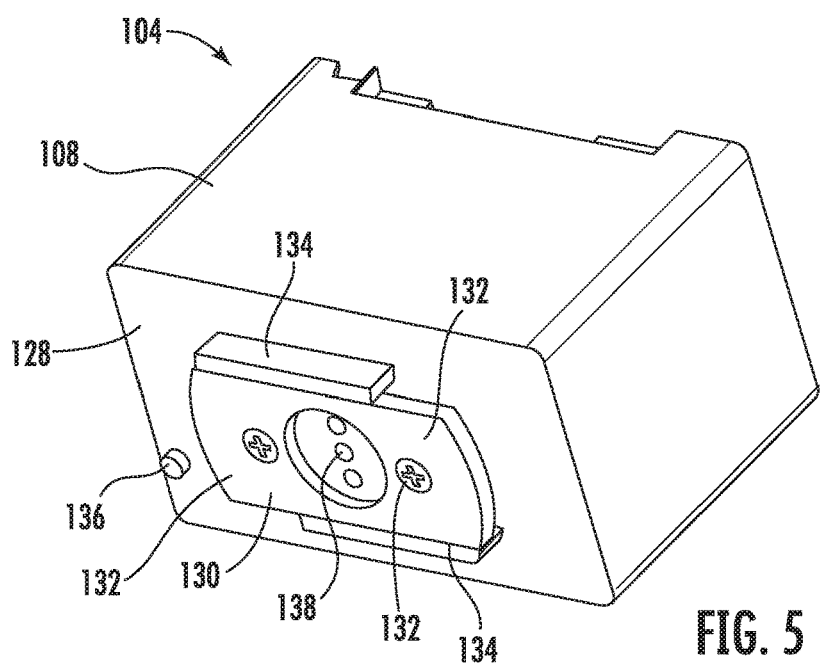
FIG. 5 is a bottom perspective view of the charging device illustrated in FIGS. 1-3.

FIG. 5 is a bottom perspective view of charging device 104. In FIG. 5, housing 108 of charging device 104 includes a bottom surface 128 located opposite top surface 114. Bottom surface 128 includes a male twist lock connector 130 for connecting with a female twist lock connector located on battery 102. Male twist lock connector 130 includes locking tabs 132 that fit under overhangs on the female twist lock connector of battery 102. Male twist lock connector 130 also includes stops 134 that prevent over-rotation of connector 130. A spring loaded pin 136 locks charging device 104 to battery 102. An electrical connector 138 electrically connects charging device 104 to battery 102.

In one example, female twist lock connector 110 on housing 108 detachably connects the top surface of housing 108 to a battery connector of tactical radio 100. Housing 108 rotates from a first position in which female twist lock connector 110 connects to a corresponding mechanical connector on tactical radio 100 to rotationally lock housing 108 to tactical radio 100 and to a second position for disconnecting female twist lock connector 110 from the corresponding mechanical connector on tactical radio 100. Male twist lock connector 130 located on the bottom surface of housing 108 detachably connects to battery 102 of tactical radio 100. Battery 102 rotates from a first position in which a connector on the battery connects with male twist lock connector 130 to rotationally lock battery 102 to housing 108 and to a second position for disengaging battery 102 from male twist lock connector 130.

Returning to FIG. 4, hand crank 106 includes a lever arm 140 and a hinge 142 about which lever arm 140 rotates. In FIG. 4, lever arm 140 is in the closed position where lever arm 140 is positioned against housing 108. When lever arm 140 rotates 180 degrees about hinge 142, lever arm 140 is in the operational position and can be cranked to actuate the charger within housing 108 to charge battery 102.

Figure 6:
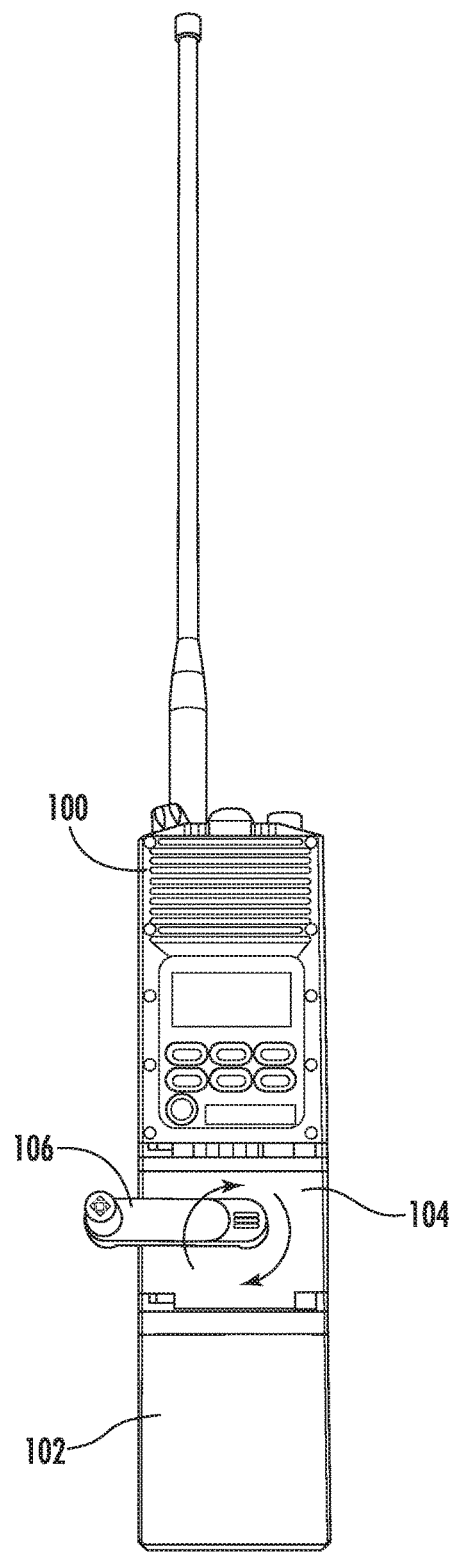
FIG. 6 is a front view of a tactical radio with the hand crank in the charging position.

FIG. 6 illustrates an example of hand crank 106 in the operational position. In FIG. 6, hand crank 106 is shown in the operational position. When hand crank 106 rotates clockwise about an axis perpendicular to the front surface of tactical radio 100, an electromagnetic charging mechanism within charging device 104 is activated to recharge battery 102. Examples of charging mechanisms that may be utilized will now be described.

Figure 7A:
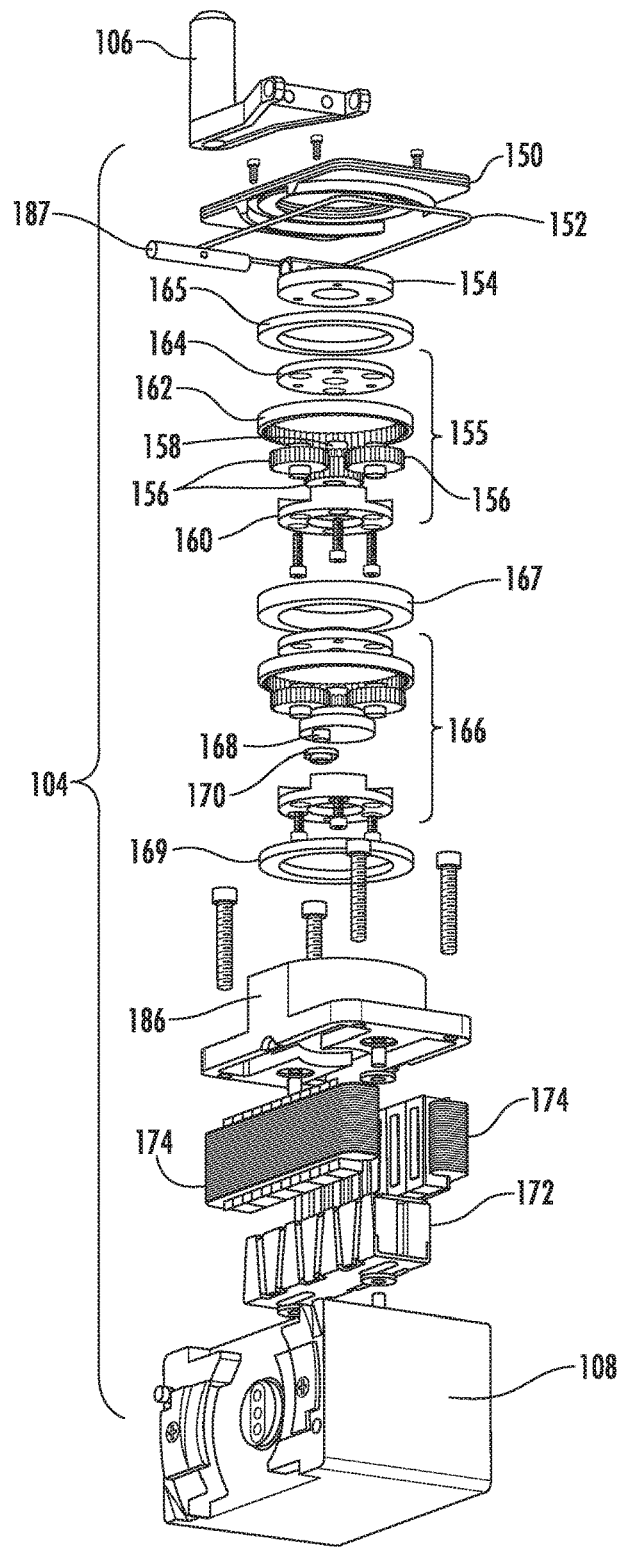
FIG. 7A is an exploded view of a linear charger that may be used with the tactical radio of any of FIGS. 1-3.

In one example, the charger within charging device 104 is a linear charger where magnets move linearly within a plurality of coils to generate the charging current. FIG. 7A illustrates such an example. Referring to FIG. 7A, charging device 104 includes an enclosure plate 150 and a gasket 152 for forming an outer seal for gears and other components within housing 108. A hand crank hub 154 provides the base to which hand crank 106 attaches.

In the Illustrated example, the gears within housing 108 include a first planetary gear assembly 155 having a first set of planetary gears 156 that rotate around a sun gear 158 within a housing formed by planetary gear housing components 160, 162, and 164. A spacer bearing 165 provides spacing between first planetary gear assembly 155 and enclosure plate 150 and allows rotation of first planetary gear assembly 155 with respect to enclosure plate 150.

A second planetary gear assembly 166 is rotationally coupled to first planetary gear assembly 155 and a similar configuration of planetary gears that revolve around a sun gear. A spacer bearing 167 provides spacing between first and second planetary gear assemblies 155 and 166 and allows rotational movement of the first and second planetary gear assemblies 155 and 166. A second spacer bearing 169 provides spacing between second planetary gear assembly 166 and gear case 186 and allows rotational movement of second planetary gear assembly with respect to gear case 186.

Second planetary gear assembly 166 includes a scotch yoke 168 and a yoke block 170 that are radially offset from an axis of rotation of the sun gear of second planetary gear assembly 166. First and second planetary gear assembles 155 and 166 rotate when hand crank 106 is rotated. Rotation of the first planetary gear assembly 155 causes rotation of second planetary gear assembly 166, which causes scotch yoke 168 to rotate and yoke block 170 move in a circular path. Yoke block 170 rides in a vertical channel formed in a surface of a linear magnetic armature 172 that faces yoke block 170, causing linear magnetic armature 172 to move laterally in a volume surrounded on at least two sides by stator laminations 174 and coils 178. Linear magnetic armature 172 may be formed of any suitable magnetic material for producing a magnetic field within the volume surrounded by stator laminations 174 and coils 178. The coils may be made of an electrically conductive material, such as copper.

The purpose of first and second planetary gear assemblies 155 and 166 is to provide a gear ratio that increases the number of rotations of scotch yoke 168 and yoke block 170 per rotation of hand crank 106. In one example, the gear ratio of the first and second planetary gear assemblies 155 and 166 may have gear ratio that produces 40 rotations of scotch yoke 168 and yoke block 170 per rotation of hand crank 106. In general, the planetary gear assemblies are configured to produce N rotations or movements of at least one magnet with respect to stator laminations 174 and coils 178 per M rotations of hand crank 106, where N and M are integers and N>M.

Figure 7B:
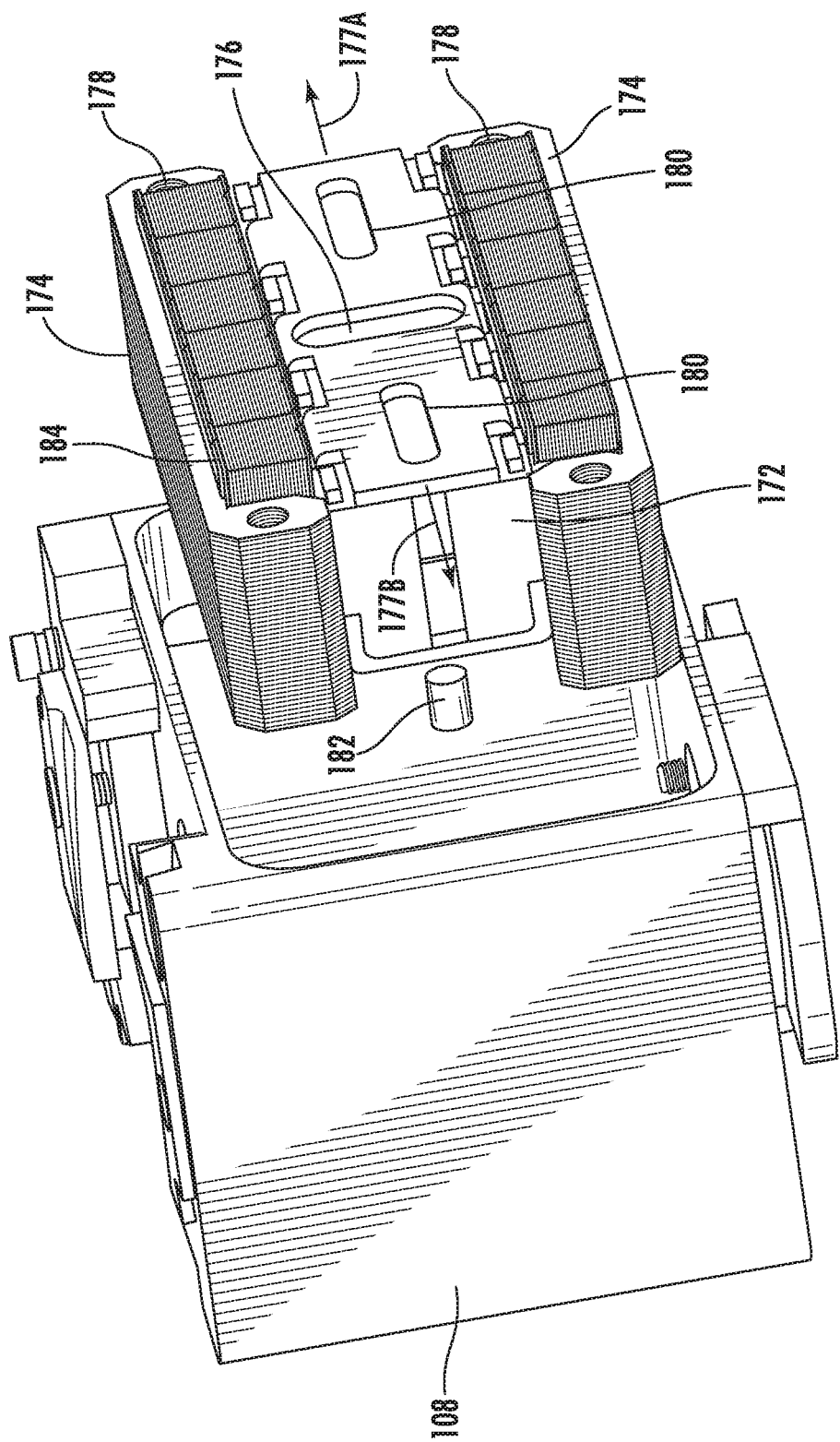
FIG. 7B is a perspective view of a housing, an armature, and a yoke block channel of the linear charger illustrated in FIG. 7A.

FIG. 7B illustrates the yoke block channel in which yoke block 170 moves. Referring to FIG. 7B, armature 172 includes yoke block channel 176. Yoke block 170 Illustrated in FIG. 7A moves in a circular path, but channel 176 is linear. As a result, the circular movement of yoke block 170 confined in the linear space of channel 176 causes armature 172 to move linearly and laterally (side to side) between stator laminations 174 and coils 178, which produces an alternating current in coils 178, which, once rectified, recharges battery 102.

Yoke block 170 is radially offset from the sun gear of second planetary gear assembly 166. When yoke block 170 rotates from the twelve o'clock position to the six o'clock position, yoke block 170 exerts lateral force in the direction of arrow 177A on yoke block channel 176 and armature 172 moves laterally in the direction of arrow 177A. Similarly, when yoke block 170 moves from the six o'clock position to the twelve o'clock position, yoke block 170 exerts lateral force in the direction of arrow 177B on armature 172, and armature 172 moves in the direction of arrow 177B. Thus, rotational movement of yoke block 170 produces linear movement of armature 172.

It can also be seen in FIG. 7B that stator laminations 174 include a plurality of thin metal sheets, which reduce eddy currents. Armature 172 includes lateral channels 180 engaged by pins 182 (one of which is visible in FIG. 7B) that define the lateral extent of motion of armature 172. Printed circuit boards 184 are located on one each of each coil 178. Printed circuit boards 184 each include a rectifier circuit that rectifies the alternating current formed by motion of armature 172 within coils 178 into direct current suitable suitable for charging battery 102. Returning to FIG. 7A, gear case 186 holds the components of the first and second planetary gear assemblies 155 and 166 within charging device housing 108. A pin 187 connects hand crank 106 hand crank hub 154.

Figure 7C:
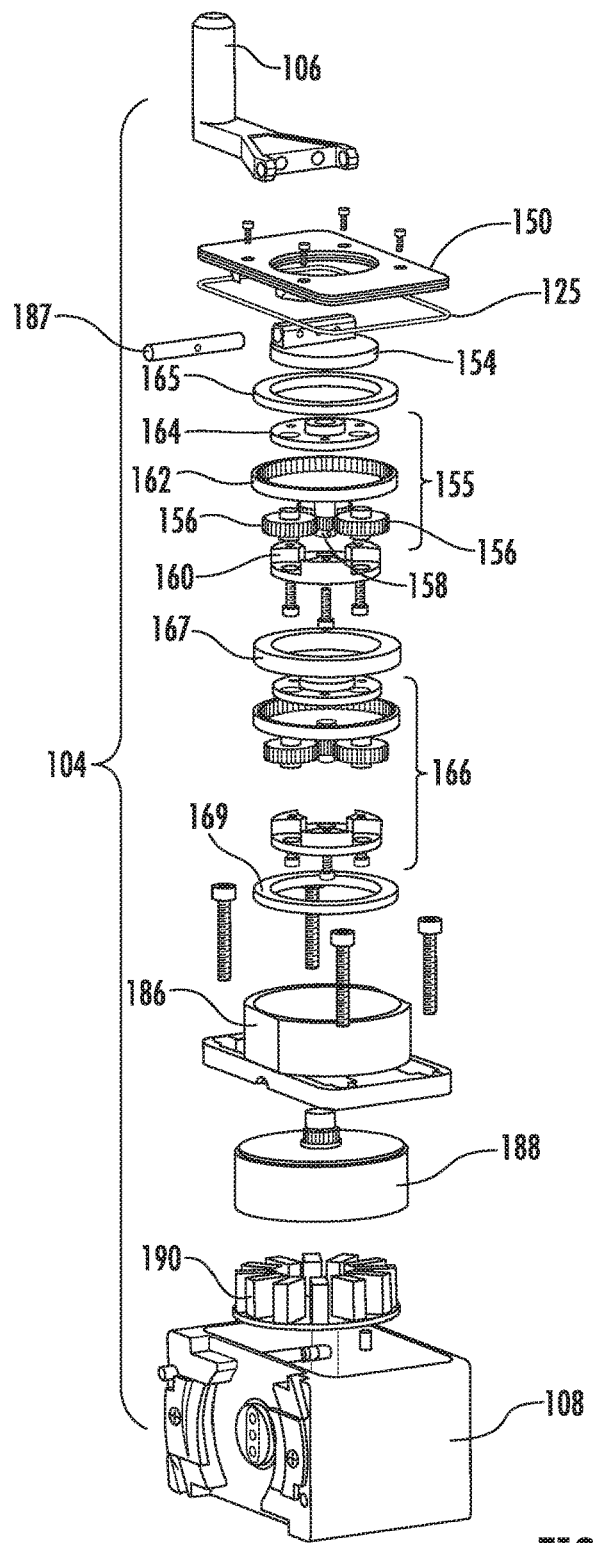
FIG. 7C is an exploded view of a rotary charger that may be used with the tactical radio of any one of FIG. 1-3.

FIG. 7C illustrates an alternate implementation of the charging mechanism within charging device 104. Rather than using a linear charger where the armature moves linearly within the stator coils, FIG. 7C illustrates an example where a rotating magnetic armature surrounds alternator coils and stator laminations and produces the charging current through rotational movement of the magnets. Referring to FIG. 7C, the correspondingly numbered components perform the same function as those Illustrated in FIG. 7A. Hence, a description of these components will not be repeated. However, rather than including linear armature 172, the charging components Illustrated in FIG. 7C include a rotating magnetic armature cup 188 that is rotated by the first and second planetary gear assemblies 155 and 166. Rotating magnetic armature cup 188 rotates around alternator stator laminations and coils 190. The result of this rotation is an alternating current, which may be rectified by rectifiers located on each coil and used to charge battery 102. Rotating magnetic armature cup 188 may be formed of any suitable magnetic material for producing a magnetic field in the volume within cup 188 in which alternator stator laminations and coils 190 reside.

Figure 7D:
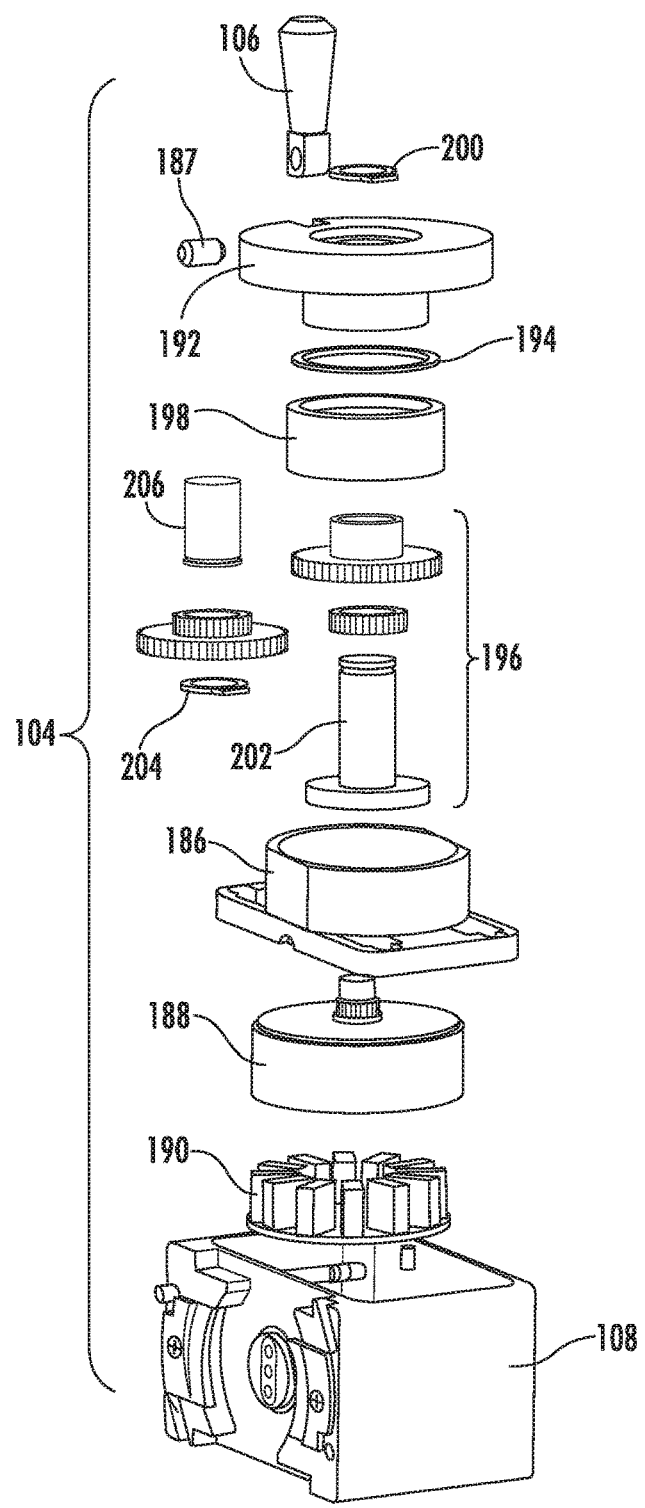
FIG. 7D is an exploded view of an alternate implementation of a rotary charger that may be used with the tactical radio of any one of FIGS. 1-3.

FIG. 7D illustrates another example of a rotary charger that can be included within charging device 104. Like the example Illustrated in FIG. 7C, the charging mechanism illustrated in FIG. 7D includes a rotary charging mechanism formed by rotating magnetic armature cup 188 and stator laminations and coils 190. However, unlike the example Illustrated in FIG. 7C, the example illustrated in FIG. 7D includes a spur gear assembly, rather than planetary gear assemblies. One advantage of the implementation Illustrated in FIG. 7D is that fewer parts are required than the implementation with planetary gear assemblies. Referring to FIG. 7D, hand crank 106 fits in a recess within rotating disk 192 and is held in place by pin 187. A gasket 194 seals the internal components of the charging mechanism Illustrated in FIG. 7D. A spur gear assembly 196 rotates within a gear housing 198 when hand crank 106 is used to rotate rotating disk 192. A first slip ring 200 fits within a recess of a shaft 202 to hold a first set of gears of spur gear assembly 196 in place. A second slip ring 204 fits within a recess of shaft 206 to hold a second set of gears of spur gear assembly 196 in place.

Spur gear assembly 196 may provide a gear ratio such that M rotations of rotating disk 192 produce M rotations of armature cup 188, where M and N are integers and N>M. Gear housing 198 fits within the recess of gear case 186. Spur gear assembly 196 rotates magnetic armature cup 188 with respect to stator laminations and coils 190 to produce the charging current. A rectifier associated with each coil rectifies the charging current from alternating current to direct current suitable for charge battery 102.

Although spur gear assembly 196 is shown only with the rotary charger illustrated in FIG. 7D, it is understood that spur gear assembly 196 could also replace the first and second planetary gear assemblies in the linear charger illustrated in FIG. 7A. Moreover, although spur and planetary gear assemblies are shown for illustrative purposes, the chargers described herein are not limit to these types of gear assemblies. Any suitable gear assembly for transferring rotational motion of the hand crank into linear or rotational movement of magnets with respect to stator laminations and coils is intended to be within the scope of the subject matter described herein.

Figure 8:
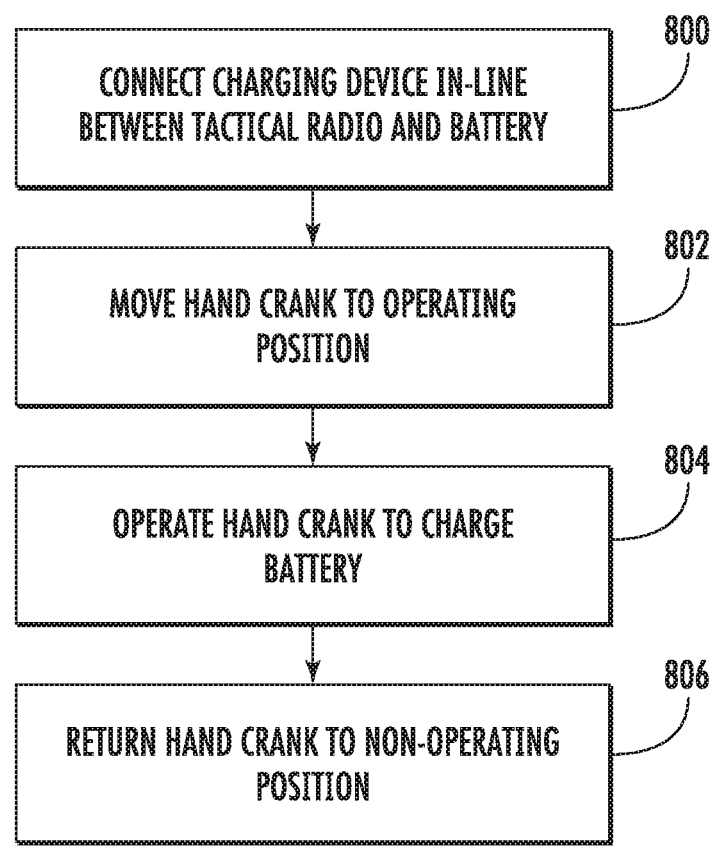
FIG. 8 is a flow chart illustrating an exemplary process for connecting a charging device in line between a tactical radio and a battery and using the charging device to charge the battery.

FIG. 8 is a flow chart illustrating an exemplary process for connecting charging device 104 to a tactical radio and a battery and for using the charging device to charge the battery when the tactical radio is in use. Referring to FIG. 9, in step 800, a charging device is connected in line between a tactical radio and a battery. For example, charging device 104 may be coupled to tactical radio 100 and battery 102 in line as illustrated in FIGS. 1-3. In step 802, the hand crank is moved to its operational position. For example, lever arm 140 can be rotated about hinge 142 to the operational position for the actuating the charger within housing 108. In step 804. The hand crank is actuated to charge the battery of the tactical radio during use. For example, hand crank 106 can be rotated with respect to housing 108 to move magnets within housing 108 within coils and generate the charging currents. In step 806, the hand crank is returned to its non-operational position, as illustrated in FIG. 4.

In the examples described above, the manual actuator for effecting movement of the armature coils with respect to the stator is a hand crank rotated by a crank arm. However, the subject mater described herein is not limited to such an embodiment. Any suitable manual actuator that can be moved by a human to move an armature is intended to be within the scope of the subject matter described herein. For example, in an alternate implementation, the manual actuator may include a pull cord wound around a spring loaded spool such that pulling the pull cord causes the spool to rotate, which effects movement of the armature.

In the examples described above, planetary and spur gear assemblies are used to increase the movement of the armature with respect to the manual actuator. However, the subject matter described herein is not limited to using only these types of gear assemblies. Any suitable gear assembly or assemblies that provide a gear ratio that is capable of enhancing relative movement of an armature with respect to a manual actuator are intended to be within the scope of the subject matter described herein. For example, the charging device may include helical gears, spiral gears, bevel gears, or any other type of gear assembly without departing from the scope of the subject matter described herein.

In line manually actuated charging device 104 may include one or more of the following additional features without departing from the scope of the subject matter described herein. For example, charging device 104 may include an auxiliary power inlet to allow charging of battery 102 when an external source of electrical power is available. When external power is connected to the auxiliary power inlet, charging device 104 may function as a pass through device for the current flowing between the external source of power and battery 102.

Charging device 104 may also include one or more charging connectors through which external devices other than battery 102 can be connected to charging device 104 for charging. The charging connectors may be universal serial bus (USB) or other suitable connector for connecting to an external device for the purpose of delivering charging current to the external device.

It will be understood that various details of the subject matter described herein may be changed without departing from the scope of the subject matter described herein. Furthermore, the foregoing description is for the purpose of illustration only, and not for the purpose of limitation.

What is claimed is:

1. An in line manually actuated charging device for charging a battery of a tactical radio, the charging device comprising:

a housing enclosing a charger for charging a battery of a tactical radio;

a manual actuator coupled to the housing for actuating the charger to charge the battery of the tactical radio;

a first mechanical connector located on a first surface of the housing for connecting the first surface of the housing to a battery connector of the tactical radio; and a second mechanical connector located on a second surface of the housing opposite the first surface for detachably connecting to the battery of the tactical radio, wherein the first and second mechanical connectors are configured such that the housing fits in line between the tactical radio and the battery.

2. The in line manually actuated charging device of claim 1 wherein the housing has a form factor that conforms to form factors of the tactical radio and the battery.

3. The in line manually actuated charging device of claim 1 wherein the first and second mechanical connectors each comprise twist lock connectors.

4. The in line manually actuated charging device of claim 1 wherein the charger comprises a linear charger including an armature, stator laminations, and coils, and rotation of the manual actuator moves the armature linearly with respect to the stator laminations and coils to generate a current.

5. The in line manually actuated charging device of claim 4 comprising at least one gear assembly, a scotch yoke, and a yoke block, wherein the at least one gear assembly is rotationally coupled to the manual actuator, the scotch yoke is rotationally coupled to the at least one gear assembly, and the yoke block is mounted on the scotch yoke at a radial offset from an axis of rotation of the gear assembly such that rotation of the manual actuator rotates the at least one gear assembly, which causes the scotch yoke to rotate the yoke block in a circular path.

6. The in line manually actuated charging device of claim 5 wherein the armature includes a yoke block channel in which the yoke block moves linearly in a first direction causing linear movement of the armature in a second direction orthogonal to the first direction.

7. The in line manually actuated charging device of claim 5 wherein the at least one gear assembly is configured to produce producing N rotations of the scotch yoke for every M rotations of the manually actuated, wherein N and M are integers and N is greater than M.

8. The in line manually actuated charging device of claim 5 wherein the at least one gear assembly comprises a planetary gear assembly.

9. The in line manually actuated charging device of claim 5 wherein the at least one gear assembly comprises a spur gear assembly.

10. The in line manually actuated charging device of claim 4 wherein the current comprises an alternating current and further comprising at least one rectifier for rectifying the alternating current to create a direct current suitable for charging the battery.

11. The in line manually actuated charging device of claim 1 wherein the charger comprises a rotary charger including a magnetic armature cup, alternator coils, and stator laminations, and rotation of the manually actuator rotates the magnetic armature cup with respect to the alternator coils and stator laminations to generate a current.

12. The in line manually actuated charging device of claim 11 comprising at least one gear assembly rotationally coupled to the manual actuator and to the magnetic armature cup for producing N rotations of the magnetic armature cup for every M rotations of the manual actuator, wherein N and M are integers and N is greater than M.

13. The in line manually actuated charging device of claim 12 wherein the at least one gear assembly comprises a planetary gear assembly.

14. The in line manually actuated charging device of claim 12 wherein the at least one gear assembly comprises a spur gear assembly.

15. An in line manually actuated charging device for charging a battery of a tactical radio, the charging device comprising:
   a housing enclosing a charger for charging a battery of a tactical radio; a manual actuator coupled to the housing for actuating the charger to charge the battery of the tactical radio;
   a first mechanical connector located on a first surface of the housing for detachably connecting the first surface of the housing to a battery connector of the tactical radio, wherein housing enclosing the charger rotates from a first position in which the first mechanical connector connects with a corresponding mechanical connector on the tactical radio to rotationally lock the housing enclosing the charger to the tactical radio and to a second position for disengaging the first mechanical connector from the corresponding mechanical connector on the tactical radio; and
   a second mechanical connector located on a second surface of the housing opposite the first surface for detachably connecting to the battery of the tactical radio, wherein battery rotates from a first position in which a connector on the battery connects with the second mechanical connector to rotationally lock the battery to the housing enclosing the charger and to a second position for disengaging the battery from the second mechanical connector and the first and second mechanical connectors are configured such that the housing fits in line between the tactical radio and the battery.

16. The manually actuated charging device of claim 15 wherein the charger comprises at least one gear assembly, at least one magnet, stator laminations, at least one coil, a scotch yoke coupled to the at least one gear assembly, and a yoke block mounted on the scotch yoke and coupled to the at least one magnet, wherein the manual actuator produces rotational movement of the scotch yoke and the yoke block causes linear movement of the at least one magnet with respect to the stator laminations and the at least one coil.

17. The in line manually actuated charging device of claim 15 wherein the charger comprises at least one gear assembly, at least one magnet, stator laminations, and at least one coil, wherein the manual actuator rotates the at least one gear assembly and the gear assembly causes the at least one magnet to move rotationally with respect to the stator laminations and the at least one coil.

18. An in line manually actuated charging device for charging a battery of a tactical radio, the charging device comprising:
   a housing enclosing a charger for charging a battery of a tactical radio;
   a manual actuator coupled to the housing for actuating the charger to charge the battery of the tactical radio;
   a first mechanical connector located on a first surface of the housing for connecting the first surface of the housing to a battery connector of the tactical radio; and
   a second mechanical connector located on a second surface of the housing opposite the first surface for detachably connecting to the battery of the tactical radio, wherein the first and second mechanical connectors are configured such that the housing fits in line between the tactical radio and the battery, wherein the charger comprises at least one magnet, stator laminations, at least one coil, and at least one gear assembly rotationally coupled to the manual actuator and to the at least one magnet such that M rotations of the manual actuator produces N movements of the at least one magnet with respect to the stator laminations and coils, N and M being integers and N>M, to produce a current in the at least one coil.

19. The in line manually actuated charging device of claim 18 comprising a scotch yoke coupled to the at least one gear assembly and a yoke block mounted on the scotch yoke and coupled to the at least one magnet, wherein the manually actuator produces rotational movement of the scotch yoke, and the yoke block causes linear movement of the at least one magnet.

20. The in line manually actuated charging device of claim 18 wherein the at least one magnet includes an armature cup formed of a magnetic material that moves rotationally with respect to the stator laminations and the at least one coil.

* * * * *